United States Patent [19]

Nakashima et al.

[11] Patent Number: 4,626,165
[45] Date of Patent: Dec. 2, 1986

[54] INDUSTRIAL ROBOT WRIST MECHANISM

[75] Inventors: Seiichiro Nakashima, Hino; Shigemi Inagaki, Kokubunji; Susumu Ito, Hino, all of Japan

[73] Assignee: Fanuc Ltd, Hino, Japan

[21] Appl. No.: 624,509

[22] PCT Filed: Oct. 20, 1983

[86] PCT No.: PCT/JP83/00367
§ 371 Date: Jun. 19, 1984
§ 102(e) Date: Jun. 19, 1984

[87] PCT Pub. No.: WO84/01538
PCT Pub. Date: Apr. 26, 1984

[30] Foreign Application Priority Data
Oct. 20, 1982 [JP] Japan .................... 57-182929

[51] Int. Cl.$^4$ .................................. B66C 1/00
[52] U.S. Cl. ........................ 414/735; 901/15; 901/23; 901/29; 901/26
[58] Field of Search .............. 414/735; 901/12, 13, 901/15, 23-26, 28, 29

[56] References Cited

U.S. PATENT DOCUMENTS 3,826,383  7/1974  Richter ............... 901/29 X
4,431,366  2/1984  Inaba et al. .......... 414/735
4,548,097  10/1985  Zimmer ............... 74/665

FOREIGN PATENT DOCUMENTS 0707793  1/1980  U.S.S.R. .............. 414/735
0763082  9/1980  U.S.S.R. .............. 414/735

Primary Examiner—Robert J. Spar
Assistant Examiner—D. Glenn Dayoan
Attorney, Agent, or Firm—Armstrong, Nikaido, Marmelstein & Kubovcik

[57] ABSTRACT

A wrist mechanism interposed between the robot arm (20) of an industrial robot and a robot hand, comprising: an outer wrist (34) joined to the free end of the robot arm (20); an inner wrist (36) pivotally supported by bearings (100, 102) within the outer wrist (34) and adapted to be pivoted by a driving force transmitted thereto through the robot arm (20); a robot hand holding part (38) supported by bearings (104, 106) within the inner wrist (36) and adapted to be turned by a rotative force transmitted thereto from the outside of the inner wrist (36) coaxially with the driving force; a bevel gear mechanism set having bevel gears (96a, 96b) and disposed within the inner wrist (36) to transmit the rotative force to the robot hand holding part (38); and a reduction gear (94) provided within the inner wrist (36) to transmit the rotative force at a reduced revolving rate to the driving bevel gear (96a) of the bevel gear mechanism.

2 Claims, 2 Drawing Figures

INDUSTRIAL ROBOT WRIST MECHANISM

TECHNICAL FIELD

The present invention relates to a wrist mechanism of an industrial robot and, more particularly, to a wrist mechanism with plural degrees of freedom having built-in differential units and facilitating compensation of the dragging drift of the wrist mechanism.

BACKGROUND ART

An industrial robot is designed to hold a robot hand on the free end of the wrist thereof and is constituted for various robot actions, such as gripping a workpiece with the robot hand, transporting a workpiece between a plurality of positions, and assembling motions. In order to carry out these robot actions, the arm joined to the robot body, the wrist joined to the free end of the arm, and the hand held by the wrist, each have a certain degree of freedom, to enable movement and positional changes of the robot hand within a space for the desired robot actions. Accordingly, the wrist joined to the free end of the robot arm has a mechanism generally of two or three degrees of freedom. When the wrist mechanism has plural degrees of freedom, particularly when the wrist comprises internal differential units, the turning motion of the external mechanism is liable to cause fundamentally unnecessary movements, generally known as "dragging drift", of the wrist. In general, the dragging drift of the wrist is compensated by the correcting action of the driving source of the wrist mechanism, until the robot hand holding part of the wrist is located at a desired position in a desired attitude.

DISCLOSURE OF THE INVENTION

Accordingly, it is an object of the present invention to provide a wrist mechanism of an industrial robot having built-in differential units and plural degrees of freedom, and facilitating compensation of the dragging drift of the wrist.

The present invention provides a wrist mechanism of an industrial robot comprising an outer wrist provided on the free end of the robot arm; an inner wrist pivotally supported on bearings within the outer wrist and adapted to be driven by a driving force transmitted through the robot arm for pivotal movement; a robot hand holding part journaled onto the inner wrist and adapted to be turned by a rotative force applied thereto by an external unit; one set of driving and driven gears provided within the inner wrist to transmit the rotative force to the robot hand holding part; and a reduction gear provided within the inner wrist to transmit the rotative force at a reduced revolving rate to the driving gear of the set of driving and driven gears; in which, as mentioned above, providing the reduction gear within the inner wrist restricts the dragging drift within a small degree proportional to the reduction ratio, whereby the compensating action by the wrist driving source is facilitated. Particularly, employment of a known Harmonic Drive mechanism (registered trade mark), and a reduction gear of a compact construction and high reduction ratio, as the reduction gear will avoid any increase in the size of the wrist even if the reduction means is formed within the wrist mechanism.

BEST MODE FOR CARRYING OUT THE INVENTION

Figure 1:
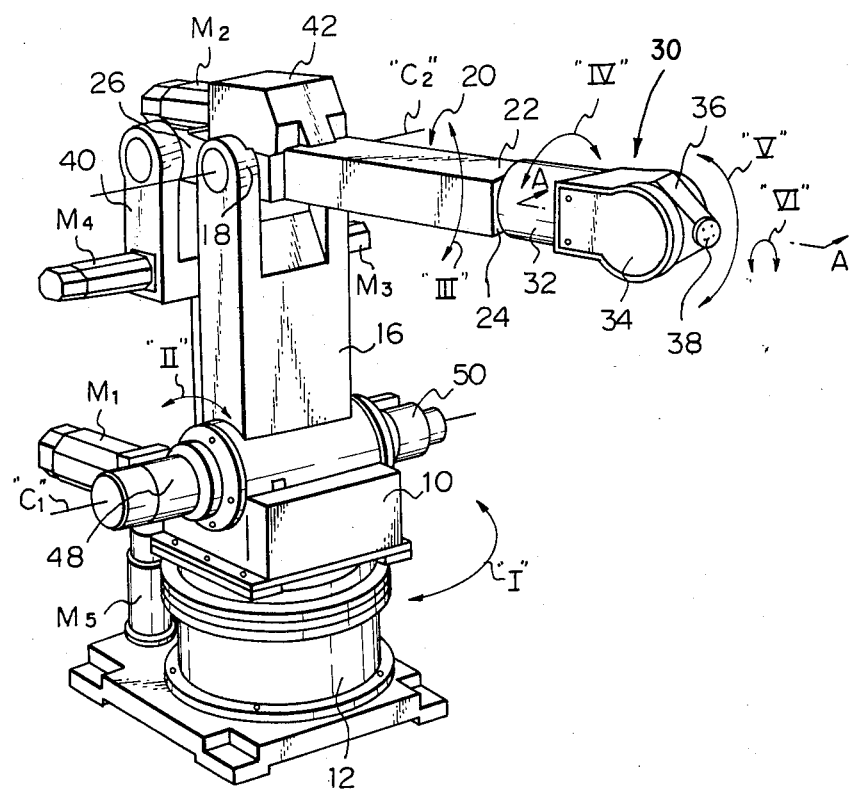
FIG. 1 is a perspective view of an exemplary articulated industrial robot equipped with a wrist mechanism according to the present invention, showing the external construction thereof.

Referring to FIG. 1, there is shown an industrial robot having a robot body 10 mounted on a swivel pedestal 12 for swivel motion in the directions indicated by the double-headed arrow "I". The robot body 10 is fixed to the swivel pedestal 12 with bolts or the like. A robot upper arm 16 is joined pivotally at the tail end thereof to the upper end of the robot body 10, for swing motion about an axis $C_1$ in the directions indicated by double-headed arrow "II". A robot forearm 20 is joined pivotally to the upper end 18 of the robot upper arm 16, for up-down swing motion about an axis $C_2$ in directions indicated by the double-headed arrow "III". The robot forearm 20 comprises a main forearm section 22 extending forward from the axis $C_2$, and a comparatively short rear forearm section 26 extending rearward from the axis $C_2$. A wrist unit 30 is attached to the free end 24 of the main forearm section 22. The wrist unit 30 comprises a wrist base 32, an inner wrist 36 supported on an outer wrist 34 fixed to the wrist base 32, and a hand holding part 38 attached to the inner wrist 36. The wrist base 32 is capable of turning together with the outer wrist 34, with respect to the main forearm section 22, in the directions indicated by the double-headed arrow "IV", while the inner wrist 36 is capable of turning, with respect to the outer wrist 34, in the directions indicated by the double-headed arrow "V". Driving sources are provided to drive the robot body 10, the robot upper arm 16, the robot forearm 20, and the wrist unit 30 for various motions; a motor $M_5$ disposed adjacent to the swivel pedestal 12 is the driving source used to drive the robot body 10 through a motion transmitting mechanism contained in the swivel pedestal 12, in the directions indicated by the double-headed arrow "I", a motor $M_1$ is the driving source used to swing the robot upper arm 16 in the directions indicated by the double-headed arrow "II", and a motor, not shown in FIG. 1, disposed in parallel to the motor $M_1$ behind the upper arm 16, is the driving source used to drive the robot forearm 20 for up-down turning motion, in the directions indicated by the double-headed arrow "III". As mentioned above, motion transmitting mechanisms, direction changing mechanisms, and speed reducing mechanisms are interposed between these motors serving as the driving sources and the corresponding driven units, to control the motions of these driven units appropriately. Reference numerals 48 and 50 indicate part of those mechanisms.

Three motors $M_2$, $M_3$, and $M_4$, serving as driving sources for the respective motions of the wrist base 32, the outer wrist 34, the inner wrist 36, and the hand holding part 38 of the wrist unit 30 attached to the free end of the forearm, are mounted collectively on the rear section 26 of the forearm 20 so that the moment of force of the rear section 26 including the motors $M_2$, $M_3$ and $M_4$ about the axis $C_2$ may counterbalance the moment of force of the main forearm section 22 of the forearm 20 about the axis $C_2$. Indicated at 40 is a housing containing part of the elements of the motion transmitting mechanisms for transmitting the rotation of the respective output shafts of the motors $M_3$ and $M_4$. Other elements of the motion transmitting mechanisms are contained in the main forearm section 22 of the forearm 20. Indicated at 42 is also a housing containing a motion transmitting mechanism or a reduction gear for transmitting the rotation of the output shaft of the motor $M_2$, and part of the same motion transmitting mechanism is also contained in the main forearm section 22. Thus, the motors $M_2$, $M_3$, and $M_4$ serving as the driving sources for the motions of three degrees of freedom of the wrist unit 30 are mounted on the rear section 26 of the forearm 20. The employment of electric servomotors capable of acting in response to command signals given by an external robot control unit as these three motors $M_2$, $M_3$, and $M_4$ makes it possible to compensate for the dragging drift, which will be described later, by the use of the robot control unit, and facilitates the compensation of the dragging drift through software means. In FIG. 1, an embodiment of the present invention is shown as applied to an articulated industrial robot in which the robot body 10 swivels on the swivel pedestal, however, it shall be understood that a wrist mechanism according to the present invention, which will be described in detail hereinafter, is applicable also to an articulated type industrial robot wherein the robot body traverses on a horizontal table.

Figure 2:
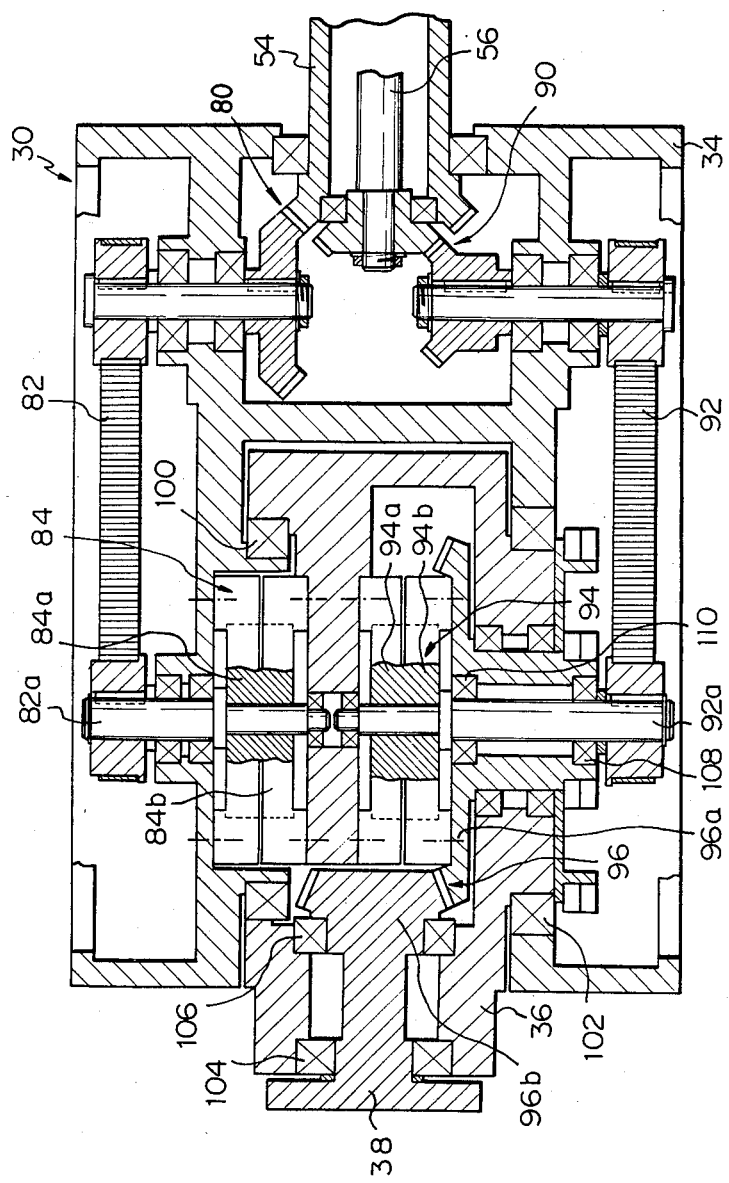
FIG. 2 is a longitudinal sectional view taken on the line A—A in FIG. 1, showing the constitution of the essential sections of a wrist mechanism according to the present invention.

FIG. 2 is a longitudinal sectional view taken on the line A—A in FIG. 1, showing the essential part of a wrist mechanism embodying the present invention. Referring to FIG. 2, the outer wrist 34 of the wrist unit 30 is joined rotatably together with the wrist base 32 to the free end of the robot arm 20 (FIG. 1), to give one degree of freedom of motion to the wrist unit 30. The outer wrist 34 is driven for turning by the rotative force of the motor $M_2$. The inner wrist 36 is journaled within the outer wrist by means of bearings 100 and 102 for tilting motion in the directions indicated by the double-headed arrow "V" in FIG. 1. Usually, the angular range of the tilting of the inner wrist 36 about the axis of the bearings 100 and 102 is an angle of approximately 200 degrees. The inner wrist 36 is driven for tilting motion through a rotary shaft 54 contained within the robot forearm 20 (FIG. 1), one bevel gear mechanism set 80, one belt-pulley mechanism set 82, and a Harmonic Drive reduction gear 84. The bevel gear mechanism 80 and the belt-pulley mechanism 82 are provided inside the outer wrist 34 and outside the inner wrist 36. The Harmonic Drive reduction gear 84 provided within the inner wrist 36 reduces the revolving rate of the input rotary motion given, through the bevel gear mechanism and the belt-pulley mechanism by the motor $M_3$ (FIG. 1), to a desired revolving rate. The Harmonic Drive reduction gear 84 has an input wheel 84a attached to the inner end of the output shaft 82a of the belt-pulley mechanism 82, an output wheel 84b fixed to the inner wrist 36, and a mechanism capable of transmitting the rotation of the input wheel 84a to the output wheel 84b at a high reduction ratio. The robot hand holding part 38 is supported rotatably by a pair of bearings 104 and 106 provided within the inner wrist 36, so that the robot hand holding part 38 is rotatable with respect to the inner wrist 36 in the directions indicated by the double-headed arrow "VI" (FIG. 1). The robot hand holding part 38 turns about the axis of the bearings 104 and 106 substantially perpendicularly intersecting the axis of the tilting motion of the inner wrist 36. A rotative force for turning the robot hand holding part 38 is transmitted from a rotary shaft 56 extending through and coaxially with the rotary shaft 54 extending through the robot forearm 20 (FIG. 1), through a bevel gear mechanism set 90 and a belt-pulley mechanism set 92, to the output shaft 92a of the belt-pulley mechanism 92. The rotative force of the output shaft 92a of the belt-pulley mechanism 92 is transmitted through the Harmonic Drive reduction gear 94 of a fixed reduction ratio to the larger driving bevel gear 96a of a bevel gear mechanism set 96, and then to the smaller driven bevel gear 96b meshing with the larger driving bevel gear 96a, to turn the robot hand holding part 38. Since the output shaft 92a of the belt-pulley mechanism 92 is supported by a pair of bearings 108 and 110 held on the larger driving bevel gear 96a, the rotative force of the output shaft 92a will never be transmitted directly to the driving bevel gear 96a. That is, the rotative force of the output shaft 92a is transmitted coaxially to the input wheel 94a of the reduction gear 94 fixed to the inner end of the output shaft 92a, and then to the driving bevel gear 96a after being reduced in revolving rate at a fixed reduction ratio between the input wheel 94a and the output wheel 94b of the reduction gear 94 fixed to the driving bevel gear 96a. The input wheel 94a of the above-mentioned reduction gear 94 is driven by the motor $M_4$ (FIG. 1) through the motion transmitting mechanisms, such as the rotary shaft 56, at a comparatively high revolving rate.

In the above-mentioned constitution of the wrist mechanism, a differential motion unit is formed between the inner wrist 36 and the robot hand holding part 38 contained within the inner wrist 36, and hence the occurrence of dragging drift is unavoidable. When the inner wrist 36 is tilted by a rotative force transmitted thereto through the output shaft 82a of the belt-pulley mechanism 82 and the reduction gear 84, the larger driving bevel gear 96a held inside the inner wrist 36 is subjected to angular displacement through the output wheel 84b of the reduction gear 84, the inner wrist 36, and the input shaft 94a, and the output shaft 94b of the reduction gear 94, and accordingly the bevel gear 96b meshing with the bevel gear 96a is also subjected to angular displacement. The turning of the hand holding part 38 resulting from the angular displacement of the bevel gear 96b is not a controlled turning motion caused by a rotative force normally transmitted thereto through the output shaft 92a of the belt-pulley mechanism 92, but is an undesirable turning motion attributable to dragging drift. Accordingly, it is necessary to restore the hand holding part 38 to the correct original position, with respect to the inner wrist 36, by turning the hand holding part 38 with respect to the inner wrist 36 through the rotary shaft 56 and the belt-pulley mechanism 92 by the compensating rotation of the driving source of the hand holding part 38. The same driving source is actuated for the compensating rotation by a command given by the robot control unit. According to the present invention, as described hereinbefore, since the dragging drift is restricted to a small degree owing to the provision of the reduction gear 94, an output power of a comparatively low level within the rated output power of the motor is a sufficient corrective rotative input power to be introduced through the output shaft 92a, and hence the reduction of the motor load is possible.

We claim:

1. A wrist mechanism of an industrial robot, comprising:

an outer wrist joined to a free end of a robot arm;

an inner wrist pivotally supported by bearings within said outer wrist and adapted to be turned about an axis by a first rotative input force transmitted thereto through said robot arm;

a robot hand holding part journaled within said inner wrist and adapted to be turned by a second rotative input force transmitted thereto from outside of said inner wrist;

a gear mechanism set having a driving gear and a driven gear for transmitting said second rotative input force to said robot hand holding part;

said driving gear of said gear mechanism being a first bevel gear to which said second rotative input force is transmitted, coaxially with said first rotative input force transmitted to said inner wrist, at a reduced revolving rate through a first reduction gear of high reduction ratio, and said driven gear of said gear mechanism being a second bevel gear meshing with said first bevel gear to transmit said second rotative input force to said robot hand holding part; and a second reduction gear of a high reduction ratio provided between said outer wrist and said inner wrist having an input wheel supported on said outer wrist and an output wheel attached to aid inner wrist for reduction of said first rotative input force transmitted to said inner wrist;

said first and second reduction gears being coaxially arranged about said axis of said inner wrist pivotal support.

2. A wrist mechanism of an industrial robot comprising:

a outer wrist joined to a free end of a robot arm for rotational motion with respect thereto about a first axis;

an inner wrist supported by and pivotally connected to said outer wrist for swinging motion about a second axis substantially perpendicular to said first axis;

a first rotative force input means arranged to impart said swinging motion to said inner wrist;

a robot hand holding part journaled within said inner wrist for rotational motion with respect thereto;

a second rotative force input means arranged to impart said rotational motion to said robot hand holding part;

means within said outer wrist connecting said second rotative force input means to said robot hand holding part comprising a first reduction gear of high reduction ratio having an input wheel connected to said second rotative force input means and an output wheel attached to a first bevel gear of a gear mechanism set, and a second bevel gear of said gear mechanism set connected to said robot hand holding part and meshing with said first bevel gear to be driven thereby at a reduced rate with respect to said second rotative force input means determined by said first reduction gear ratio; and means within said outer wrist connecting said first rotative force input means to said inner wrist comprising a second reduction gear of high reduction ratio having an input wheel connected to said first rotative force input means and an output wheel attached to said inner wrist to drive said inner wrist at an reduced rate with respect to said first rotative force input means determined by said second reduction gear ratio, said first reduction gear and said second reduction gear being coaxially arranged about said second axis of said inner wrist swinging motion.

* * * * *